UNITED STATES PATENT OFFICE.

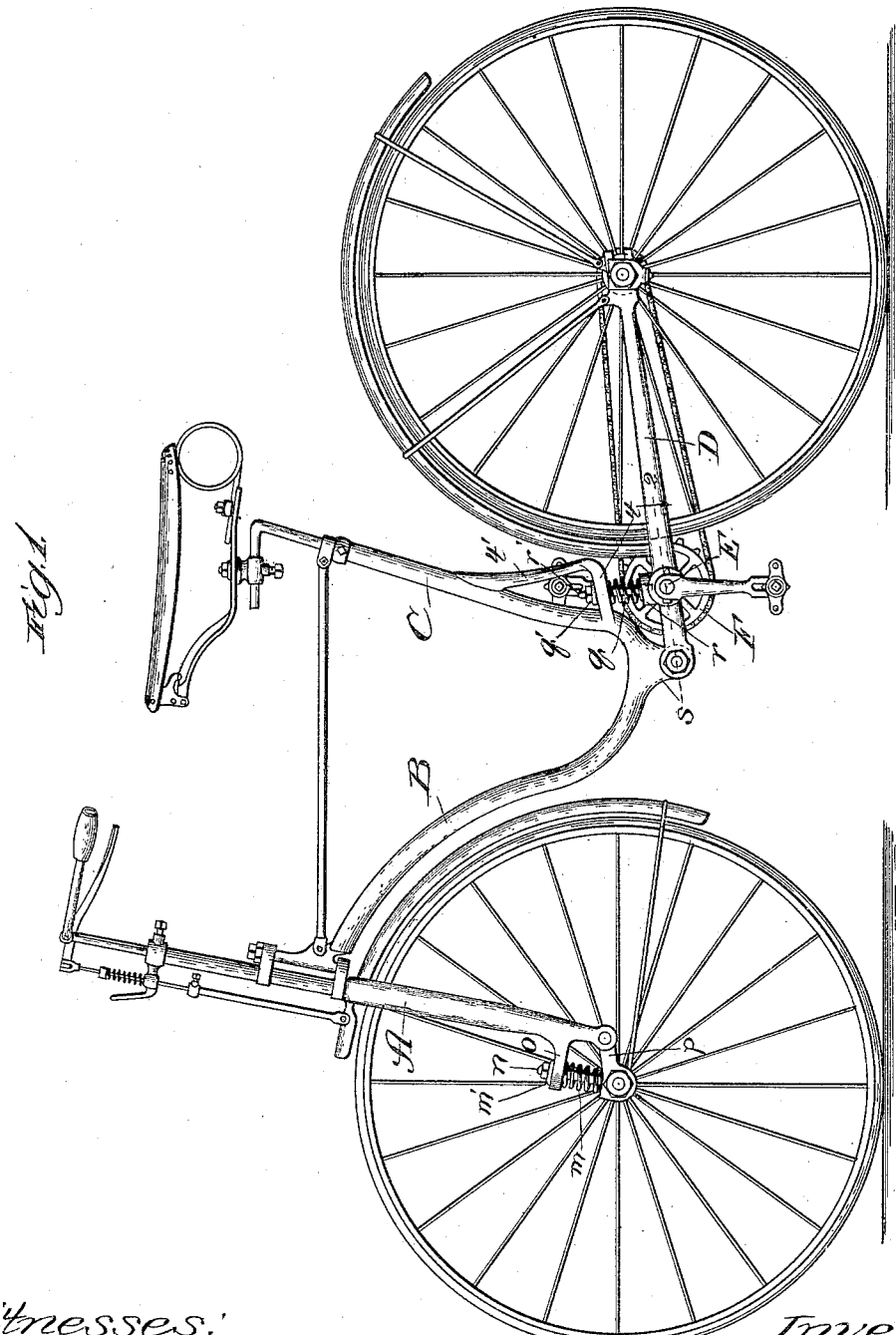

CHARLES E. McGLINCHEY, OF CHICAGO, ILLINOIS, ASSIGNOR TO CHARLES F. STOKES, OF SAME PLACE.

VELOCIPEDE.

SPECIFICATION forming part of Letters Patent No. 465,599, dated December 22, 1891.

Application filed December 24, 1890. Serial No. 375,663. (No model.)

*To all whom it may concern:*

Be it known that I, CHARLES E. MCGLINCHEY, a citizen of the United States, residing at Chicago, in the county of Cook and State of Illinois, have invented a new and useful Improvement in Velocipedes, of which the following is a specification.

My invention relates to improvement in the frames of Safety bicycles, my object being to provide a new and effective disposition of spring mechanism therefor to enhance the comfort of the rider.

The drawing shows a view in elevation of a Safety bicycle provided with my improvement.

The frame-work of the bicycle illustrated comprises a front fork A, a frame in the nature of a backbone B, and a frame C, integral with each other, constituting together the seat-supporting frame and a rear fork or driving-wheel frame D. The seat-supporting frame is provided on its rear side and near its lower extremity with an offset or shoulder $t$, which is strengthened by a brace $t'$, extending upward to the said frame, as shown. On the under side of the frame B C is an ear $s$, to which the rear fork is pivotally secured at its forward end. Upon the rear fork, directly under the shoulder $t$, is a boss $r$, from the center of which rises a rod or bolt $r'$, threaded along its upper portion, which extends loosely through an opening in the shoulder. About the bolt $r'$ is a coiled spring $q$, which bears at opposite ends, respectively, against the boss $r$ and under side of the shoulder $t$, and on the upper side of the shoulder the bolt $r'$ is provided with a nut $q'$, which, by bearing against the upper side of the offset, holds the parts together against the resistance of the spring and which may be tightened or loosened to increase or diminish the tension of the spring when desired. Owing to the nature of the construction, the weight of the rider is borne, mainly at least, by the spring $q$, which affords a cushion to diminish the jolting effect upon the rider in traversing rough roads. The spring $q$ is of stiff quality, and its expansion and contraction are within such short limits that in its action with the pedals in the position shown no such lengthening and shortening of the distance between the saddle and pedals occur as would prove objectionable to the rider. However, such variations in distance between the seat and pedals could be readily decreased or overcome by moving the bearing for the pedal-shaft toward or to the point of pivotal connection between the frames. Although the spring $q$ acts more especially to cushion the seat-supporting frame against the jolting of the rear wheel, which jolting, that wheel being most nearly under the rider, would necessarily the more immediately affect him, inasmuch as the weight of the rider is distributed over both wheels, the spring $q$ will obviously also in a measure exert its cushioning effect against jolting to which the forward wheel is subjected. To further neutralize any jolting effect from the front wheel, however, I provide a front fork of the construction shown and to be described.

Pivotally supported upon the axle of the front wheel, at opposite sides of the latter, are links $p$, to the free ends of which the ends of the fork A are pivotally secured. Upon the forks and extending over the links near the latter are offsets or shoulders $o$. Rods or bolts $n$ extend upward from the links above the axle and through openings in the shoulders $o$. About the bolts, between the links and shoulders, are springs $m$, and the bolts are threaded along their upper portions to receive nuts $m'$, which hold the parts in position and by means of which the tension of the springs may be regulated, if desired. The front fork and weight sustained thereby exert their pressure upon the springs $m$, the links operating merely to afford the necessary secure connection between the front fork and axle.

The offset $t$ and its brace $t'$, besides affording a bearing for the spring $q$, add materially to the strength of the seat-supporting frame.

What I claim as new, and desire to secure by Letters Patent, is—

In a velocipede, the combination, with a vertically-disposed seat-supporting frame, of a rear-wheel frame, pivotally connected at its forward end with the lower end of the seat-supporting frame and extending at an angle therefrom, a shoulder $t$ upon the seat-supporting frame, a brace $t'$, extending upward from the said shoulder to the said frame, a spring confined in the angle between the two frames and bearing at opposite ends, respectively, against the shoulder $t$ and rear-wheel frame, and a rod $r'$ upon the rear-wheel frame, extending through an opening in the said shoulder and limiting the distance of separation of the two frames, substantially as and for the purpose set forth.

CHARLES E. McGLINCHEY.

In presence of:
 J. W. DYRENFORTH,
 M. J. FROST.